United States Patent
Jung et al.

(10) Patent No.: US 8,611,779 B2
(45) Date of Patent: Dec. 17, 2013

(54) SMELL DILUTION UNIT AND ELECTROPHOTOGRAPHIC IMAGE FORMING APPARATUS INCLUDING THE SAME

(75) Inventors: Yong-kyun Jung, Suwon-si (KR); Heung-suo Park, Suwon-si (KR); Taek-yong Jung, Suwon-si (KR); Chang-woo Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 188 days.

(21) Appl. No.: 13/064,458

(22) Filed: Mar. 25, 2011

(65) Prior Publication Data
US 2012/0070182 A1      Mar. 22, 2012

(30) Foreign Application Priority Data
Sep. 17, 2010   (KR) .................. 10-2010-0091962

(51) Int. Cl.
*G03G 21/20*       (2006.01)
*B01J 19/00*       (2006.01)

(52) U.S. Cl.
USPC ............................................ 399/93; 422/124

(58) Field of Classification Search
USPC .............................................................. 399/93
See application file for complete search history.

(56) References Cited

U.S. PATENT DOCUMENTS

| | | | |
|---|---|---|---|
| T940022 I4 * | 11/1975 | Rodda .............................. | 399/93 |
| 4,320,873 A * | 3/1982 | Martens et al. .................. | 239/6 |
| 5,704,832 A * | 1/1998 | Borrell .......................... | 454/157 |
| 6,094,549 A * | 7/2000 | Hiraoka et al. .................. | 399/93 |
| 2003/0222374 A1* | 12/2003 | Castellari et al. ........... | 264/210.8 |
| 2006/0013605 A1* | 1/2006 | Tanaka ............................ | 399/53 |
| 2007/0110469 A1* | 5/2007 | Kasai ............................ | 399/93 |
| 2007/0183808 A1* | 8/2007 | Jeon .............................. | 399/92 |
| 2010/0178091 A1* | 7/2010 | Jang .............................. | 399/402 |

* cited by examiner

Primary Examiner — Clayton E Laballe
Assistant Examiner — Jas Sanghera
(74) Attorney, Agent, or Firm — Staas & Halsey LLP

(57) ABSTRACT

A smell dilution unit includes: a blower fan; a duct which guides an external air introduced from the blower fan; and a deodorization unit which contains a smell masking agent and allows an odor of the smell masking agent to be mixed with the external air introduced from the blower fan. Since the deodorization unit containing the smell masking agent, which is replaceable, is installed in the duct, the smell dilution unit may dilute an unpleasant smell generated during printing.

12 Claims, 4 Drawing Sheets

SMELL DILUTION UNIT AND ELECTROPHOTOGRAPHIC IMAGE FORMING APPARATUS INCLUDING THE SAME

CROSS-REFERENCE TO RELATED APPLICATIONS

This application claims the benefit of Korean Patent Application No. 10-2010-0091962, filed on Sep. 17, 2010, in the Korean Intellectual Property Office, the disclosure of which is incorporated herein in its entirety by reference.

BACKGROUND

1. Field

Embodiments relate to a smell dilution unit for diluting a smell generated during printing and an electrophotographic image forming apparatus including the smell dilution unit.

2. Description of the Related Art

Image forming apparatuses using electrophotography are apparatuses for forming images by receiving a digital image signal, forming an electrostatic latent image on a photosensitive medium by using an exposure unit such as a laser scanning unit, developing the electrostatic latent image by using a developing agent, transferring the developed image to a recording medium, and applying heat and pressure to fuse the transferred image onto the recording medium.

A color image is formed by disposing in an overlapping manner a plurality of developing cartridges in which four colors of toner (cyan, yellow, magenta, and kara) are respectively stored to pile up the colors of toner.

When printing is performed indoors, a user may feel headache and nausea due to a smell generated during the printing. In this case, the user may perceive the smell as harmful and may hesitate to use an image forming apparatus.

Various methods have been suggested to solve this problem, and objectives of most of the methods are to make a user not clearly perceive the smell rather than to completely remove the smell.

One of the methods includes mixing or adding a smell masking agent with or to toner such that an unpleasant smell is diluted with an odor generated by the smell masking agent during printing, thereby preventing a user from feeling uncomfortable.

However, toner having been transferred to a recording medium and then passed through a fuser is fused onto the recording medium at high temperature and high pressure. At this time, the toner may be decomposed and a harmful smell may be generated due to a by-product. That is, the smell masking agent itself added to the toner in order to remove an unpleasant smell generated during printing additionally generates a harmful smell due to the high temperature and high pressure.

SUMMARY

The present invention provides a smell dilution unit for diluting an unpleasant smell generated during printing by supplying not only an external air but also an odor of a smell masking agent to an image forming apparatus, and an electrophotographic image forming apparatus including the smell dilution unit.

According to an aspect, there is provided a smell dilution unit including: a blower fan; a duct which guides an external air introduced from the blower fan; and a deodorization unit which contains a smell masking agent and allows an odor of the smell masking agent to be mixed with the external air introduced from the blower fan.

According to another aspect, there is provided an electrophotographic image forming apparatus including: a main body; a printing unit which is disposed inside the main body and prints an image; a paper discharging unit which discharges paper on which the image is formed; and a smell dilution unit which includes: a blower fan, a duct which guides an external air introduced from the blower fan, and a deodorization unit which contains a smell masking agent and allows an odor of the smell masking agent to be mixed with the external air introduced from the blower fan.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
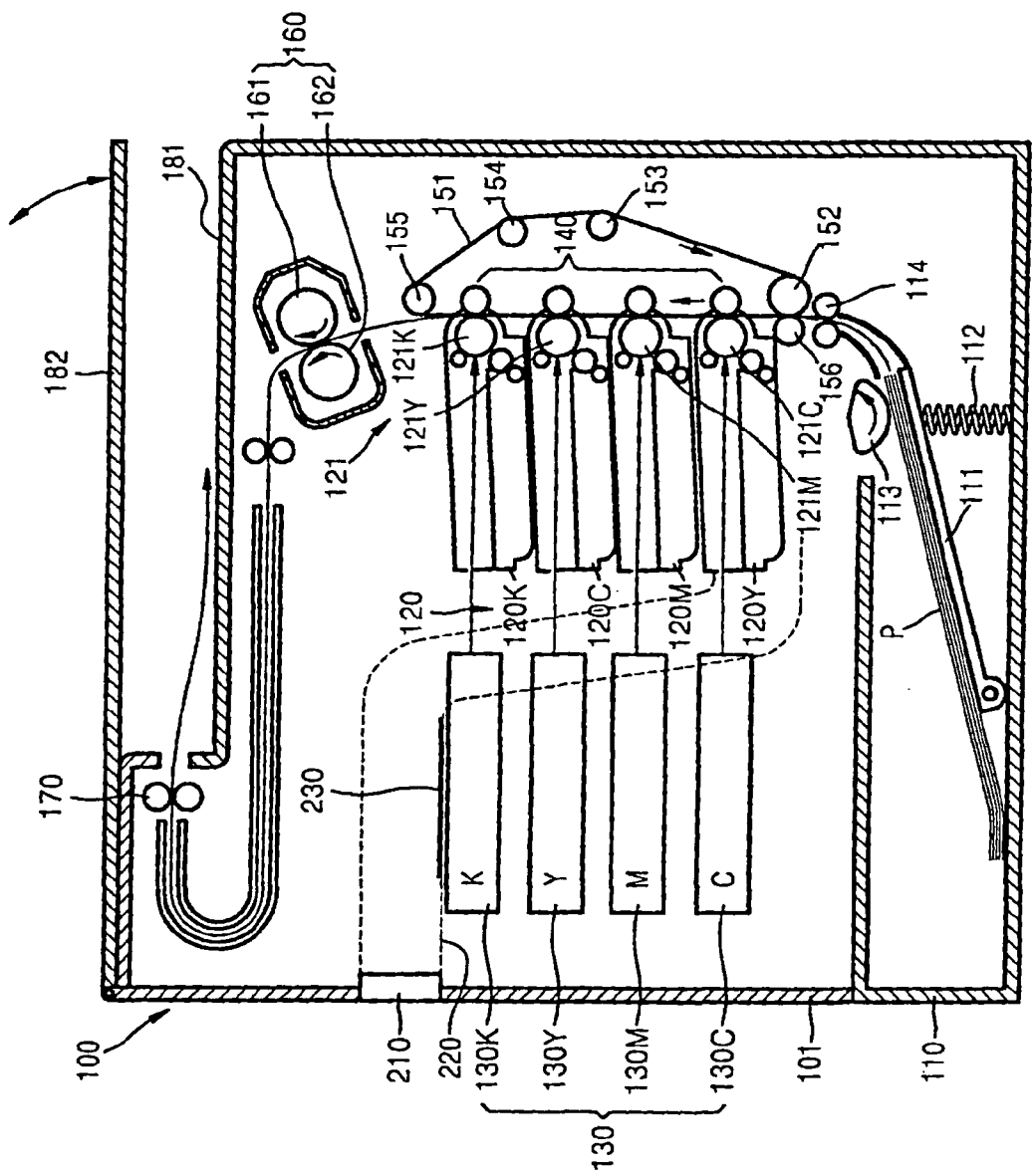
FIG. 1 is a side cross-sectional view illustrating a structure of an electrophotographic image forming apparatus according to an embodiment.

Reference will now be made in detail to the embodiments, examples of which are illustrated in the accompanying drawings, wherein like reference numerals refer to like elements throughout.

FIG. 1 is a side cross-sectional view illustrating a structure of an electrophotographic image forming apparatus 100 according to an embodiment.

The electrophotographic image forming apparatus 100 for printing an image on paper P by using electrophotography includes a cassette 110 which allows the paper P to be loaded thereon and is detachably installed in a main body 101.

The cassette 110 includes a paper support 111 which is upwardly movable due to a spring 112 and on which the paper P is loaded. A pickup roller 113 for picking up each piece of paper P while rotating is installed above the cassette 110.

The electrophotographic image forming apparatus 100 includes a printing unit including a developing cartridge unit 120, an exposure unit 130, a transfer roller unit 140, a transfer belt 151, and a fusing unit 160, and a paper discharging unit 181 for discharging the paper P on which an image is completely formed.

The developing cartridge unit 120, which is a device for storing toner, and supplying the toner to an electrostatic latent image corresponding to a printing digital signal to develop the electrostatic latent image to a toner image, includes a plurality of developing cartridges 120C, 120M, 120Y, and 120K in which a plurality of colors of toner (yellow, magenta, cyan, and kara) are respectively stored."

The developing cartridge 120 may include a photosensitive drum unit 121 on which an electrostatic latent image corresponding to an image to be printed by the exposure unit 130 is formed, a developing roller which is spaced apart by a predetermined interval from the photosensitive drum unit 121 and attaches toner to the electrostatic latent image formed on the photosensitive drum unit 121 by using a potential difference between the developing roller and the photosensitive drum unit 121, and a supply roller which supplies the toner to the developing roller.

A charging roller 156 for charging the photosensitive drum unit 121 to a predetermined potential and a cleaning blade for removing waste toner remaining on a surface of the photosensitive drum unit 121 after a developed image is transferred to the paper P may be installed around the photosensitive drum unit 121 to contact the photosensitive drum unit 121.

The exposure unit 130 includes a plurality of exposure members 130C, 130M, 130Y, and 130K which respectively correspond to the plurality of developing cartridges 120C, 120M, 120Y, and 120K and respectively emit light to photosensitive drums 121C, 121M, 121Y, and 121K of the photosensitive drum unit 121 to form electrostatic latent images. If necessary, one exposure member may be used to emit light to the photosensitive drums 121C, 121M, 121Y, and 121K to form electrostatic latent images.

The transfer belt 151 supported by a plurality of rollers 152, 153, 154, and 155 transports the paper P, which is picked up from the cassette 110 and fed by a feed roller 114, while rotating in a closed curve shape, such that the paper P sequentially faces the plurality of developing cartridges 120C, 120M, 120Y, and 120K. In this case, the transfer belt 151 is rotated while continuously contacting the plurality of photosensitive drums 121C, 121M, 121Y, and 121K.

The charging roller 156 for charging the transfer belt 151 to a predetermined potential by contacting the transfer belt 151 is installed under the transfer belt 151. The charging roller 156 charges the transfer belt 151 to a predetermined potential such that the paper P is attached to the transfer belt 151.

The transfer roller unit 140 includes a plurality of transfer rollers which are installed within the transfer belt 151 to respectively face the developing cartridges 120C, 120M, 120Y, and 120K with the transfer belt 151 therebetween. The transfer roller unit 140 transfers developed images formed on the plurality of photosensitive drums 121C, 121M, 121Y, and 121K to the paper P fed by the transfer belt 151.

The fusing unit 160 for fusing the developed image on the paper P includes a heating roller 161 for applying heat to the developed image, and a pressure roller 162 which faces the heating roller 161 and pressurizes the paper P, which passes through a space between the heating roller 161 and the pressure roller 162, toward the heating roller 161.

A paper exit unit 170 includes one pair of paper discharging rollers which are installed to face each other and discharge the paper P, onto which the developed image is fused while passing through the fusing unit 160, to the outside. The paper P discharged by the paper exit unit 170 is loaded on the paper discharging unit 181 disposed over the electrophotographic image forming apparatus 100.

A cover 182 is attached with a hinge to an upper side of the main body 101 to open and close the paper discharging unit 181 while moving in a direction indicated by an arrow. If possible, a paper scanning unit instead of the cover 182 may be attached with a hinge to the main body 101 to open and close the paper discharging unit 181 while moving in the direction indicated by the arrow.

Figure 2:
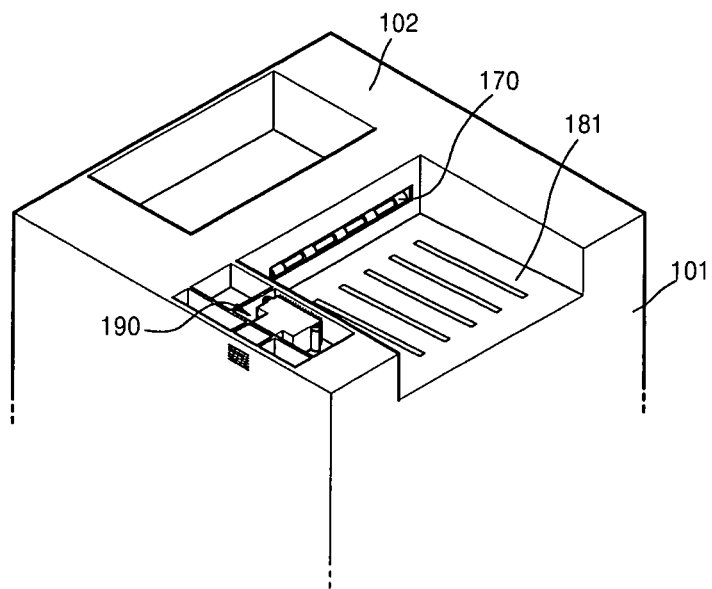
FIG. 2 is a perspective view illustrating a structure of the electrophotographic image forming apparatus of FIG. 1 including a smell dilution unit according to an embodiment.
Figure 3:
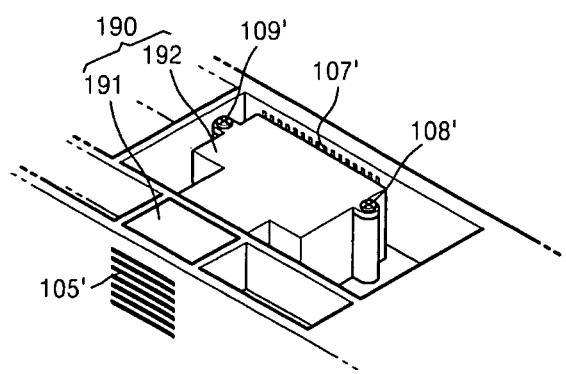
FIG. 3 is a partial perspective view illustrating a case where a smell dilution unit is installed in a main body.
Figure 4:
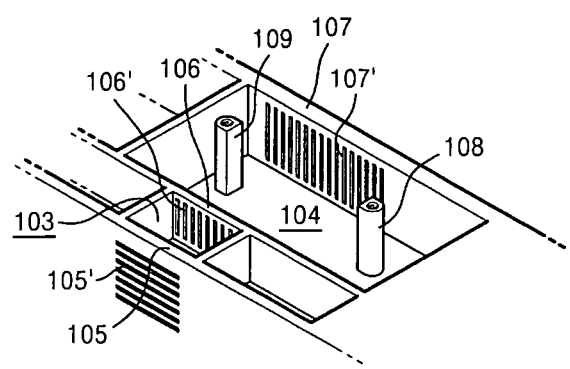
FIG. 4 is a partial perspective view illustrating the main body in which the smell dilution unit is installed.
Figure 5:
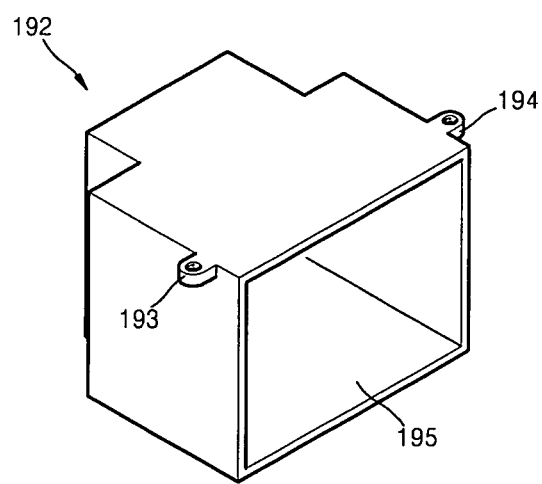
FIG. 5 is a perspective view illustrating a duct and a deodorization unit constituting the smell dilution unit.

FIG. 2 is a perspective view illustrating a structure of the electrophotographic image forming apparatus 100 of FIG. 1 including a smell dilution unit 190 according to an embodiment. FIG. 3 is a partial perspective view illustrating a case where the smell dilution unit 190 is installed in the main body 101. FIG. 4 is a partial perspective view illustrating the main body 101 in which the smell dilution unit 190 is installed. FIG. 5 is a perspective view illustrating a duct 192 and a deodorization unit 195 constituting the smell dilution unit 190.

Referring to FIG. 2, the cover 182 is removed and the paper discharging unit 181 is exposed. The smell dilution unit 190 is installed on a portion of a top surface 102 of the main body 101 which surrounds the paper discharging unit 181.

Referring to FIGS. 2 through 5, the smell dilution unit 190 includes a blower fan 191 which introduces an external air, the duct 192 which guides the external air introduced from the blower fan 191 toward the paper discharging unit 181, and the deodorization unit 195 which is disposed on one side of the duct 192 and contains a smell masking agent.

The deodorization unit 195 is formed of a nonwoven fabric containing the smell masking agent, and may become one side surface of the duct 192 or may be attached to one side surface of the duct 192. The deodorization unit 195 becomes one side surface of the duct 192 in FIG. 3.

The smell masking agent may be any one of an extract of a plant such as a tree (e.g., Japanese cypress or Japanese cedar) or a rhizome (e.g., fragrant grass, horseradish, or peppermint), fitontsid, cinnamon, mint, benzo aldehyde, lactones, ketons, and esters.

A blower fan space 103 in which the blower fan 191 is detachably installed, and a duct space 104 in which the duct 192 is detachably installed adjacent to the blower fan space 103 are formed on the top surface 102 of the main body 101. Grill structures 105', 106', and 107' each having a plurality of slits are respectively formed in a portion 106 between the blower fan space 103 and the duct space 104, a portion 105 where the blower fan space 105 is exposed to the outside, and a portion 107 where the duct space 104 contacts the paper discharging unit 181 to separate the portions 106, 105, and 107 from one another and allow an air to communicate therethrough. The grill structure 105' formed in the portion 105 where the blower fan space 103 is exposed to the outside is different from the grill structure 106' formed in the portion 106 between the blower fan space 103 and the duct space 103 and the grill structure 107' formed in the portion 107 where the duct space 104 contacts the paper discharging unit 181. That is, the slits of the grill structure 105' are horizontally formed whereas the slits of the grill structures 106' and 107' are vertically formed. However, the present embodiment is not limited thereto and the slits of the grill structures 106', 105', and 107' may have the same shape or may be different in positions as long as an air communicates through the slits.

Although the duct 192 has a stepped shape, the present embodiment is not limited thereto, and various modifications may be made. For example, the duct 192 may be inclined or may have both side surfaces which are parallel to each other.

Fixing units 193 and 194 protrude from both sides of the duct 192. The fixing units 193 and 194 may be fixed to fixing supports 108 and 109 formed in the duct space 104 by using fastening means such as screws 108' and 109'.

In the above structure, an external air introduced by the blower fan 191 passes through the duct 192 and is mixed with an odor of the smell masking agent diffused from the deodorization unit 195. The external air mixed with the odor of the smell masking agent passes through the duct 192 and is discharged to the paper discharging unit 181. The odor of the smell masking agent discharged to the paper discharging unit 181 is mixed with an unpleasant smell generated during printing to dilute the unpleasant smell. Accordingly, a user does not perceive the diluted unpleasant smell as unpleasant.

Figure 6:
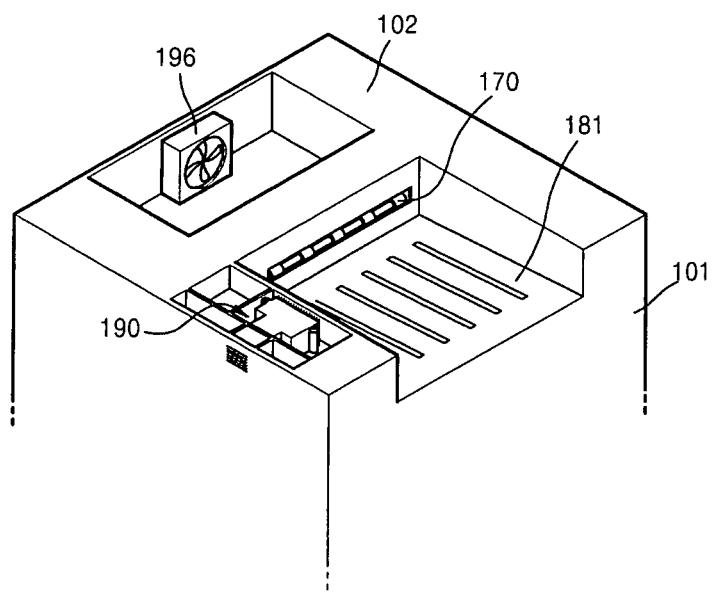
FIG. 6 is a perspective view illustrating a structure of the electrophotoelectric image forming apparatus including an exhaust fan in addition to the structure of FIG. 2, according to another embodiment.

FIG. 6 is a perspective view illustrating the electrophotographic image forming apparatus 100 including an exhaust fan 196 in addition to the structure of FIG. 2, according to another embodiment.

Referring to FIG. 6, the exhaust fan 196 is further disposed in addition to the structure illustrated in FIG. 2. The exhaust fan 196 is installed to discharge an air inside the main body 101 to the outside (back of the main body 101) in a direction opposite to a direction in which the paper P on which an image is formed is discharged to the paper discharging unit 181. The exhaust fan 196 may have the same structure as that of the blower fan 191 (see FIG. 2), and may further include therein a deodorization unit containing a smell masking agent. A structure of the deodorization unit is the same as that illustrated in FIG. 4.

In the above structure, an odor of the smell masking agent is applied by the smell dilution unit 190 to the paper discharging unit 181, and an unpleasant smell generated from the printing unit inside the main body 101 and diffused toward the paper discharging unit 181 along with the paper P on which an image is formed is discharged to the outside and the smell masking agent is also discharged by the exhaust fan 196.

Accordingly, because an odor of a smell masking agent is transmitted to the paper discharging unit 181 by the smell dilution unit 190 and an odor of a smell masking agent is transmitted to the outside of the image forming apparatus by the exhaust fan 196, a user does not feel an unpleasant small generated during printing.

In addition, referring to FIG. 1, a main fan 210 is installed in the main body 101, and a main duct 220 (indicated by a dotted line) is installed inside the main body 101 to connect the main fan 210 to the plurality of developing cartridges 120Y, 120M, 120C and 120K. A deodorization unit 230 containing a small masking agent may be installed inside the main duct 220. The main fan 210 may be installed to discharge an air to the back of the electrophotographic image forming apparatus 100.

In the above structure, the main fan 210 discharges an air inside the main body 101 to the outside through the main duct 220. In this case, an odor of the smell masking agent diffused from the deodorization unit 230 may also be discharged to the outside of the electrophotographic image forming apparatus 100 along with the air. Accordingly, since an unpleasant smell in the main body 101 is discharged to the outside and is mixed with the odor of the smell masking agent, a user does not perceive any unpleasant smell generated during printing.

The main fan 210 may discharge to the outside an unpleasant smell generated when one of the plurality of developing cartridges 120Y, 120M, 120C, and 120K is replaced, and may also discharge to the outside an unpleasant smell generated while the plurality of developing cartridges 120Y, 120M, 120C, and 120K operate during printing.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. A smell dilution unit comprising:
    a blower fan;
    a duct which guides an external air introduced from the blower fan; and
    a deodorization unit which contains a smell masking agent and allows an odor of the smell masking agent to be mixed with the external air introduced from the blower fan;
    wherein the odor of the smell masking agent and the external air introduced through the duct from the blower fan are applied directly to a paper discharging unit of an image forming apparatus.

2. The smell dilution unit of claim 1, wherein the deodorization unit is formed of a nonwoven fabric attached to one side of the duct.

3. The smell dilution unit of claim 1, wherein the smell masking agent is any one of fitontsid, cinnamon, mint, benzo aldehyde, lactones, ketones, and esters.

4. An electrophotographic image forming apparatus comprising:
    a main body;
    a printing unit which is disposed inside the main body and prints an image;
    a paper discharging unit which discharges paper on which the image is formed; and a smell dilution unit which comprises:
        a blower fan,
        a duct which guides an external air introduced from the blower fan, and
        a deodorization unit which contains a smell masking agent and allows an odor of the smell masking agent to be mixed with the external air introduced from the blower fan;
    wherein the odor of the smell masking agent and the external air introduced through the duct from the blower fan are applied directly to a paper discharging unit.

5. The electrophotographic image forming apparatus of claim 4, wherein the deodorization unit is formed of a nonwoven fabric attachable/detachable to/from one side of the duct.

6. The electrophotographic image forming apparatus of claim 4, wherein the smell masking agent is any one of fitontsid, cinnamon, mint, benzo aldehyde, lactones, ketones, and esters.

7. The electrophotographic image forming apparatus of claim 4, wherein a blower fan space in which the blower fan is installed, and a duct space in which the duct is installed adjacent the blower fan space are formed at one side of the paper discharging unit on the main body, and grill structures are respectively formed in a portion between the blower fan space and the duct space, a portion where the blower fan space is exposed to the outside, and a portion where the duct space contacts the paper discharge unit to communicate an air therethrough.

8. The electrophotographic image forming apparatus of claim 4, further comprising an exhaust fan which is disposed to discharge an air to the outside in a direction opposite to a direction in which the paper is discharged to the paper discharging unit.

9. The electrophotographic image forming apparatus of claim 8, wherein the exhaust fan comprises a deodorization unit containing a smell masking agent.

10. The electrophotographic image forming apparatus of claim 4, wherein a main duct which guides an air to the outside and a main fan which is connected to the main duct and discharges an air to the outside are further provided in the main body, and a deodorization unit containing a smell masking agent is installed in the main duct.

11. The electrophotographic image forming apparatus of claim 10, wherein the main duct is connected to at least one developing cartridge.

12. The electrophotographic image forming apparatus of claim 4, further comprising a cover which is attached with a hinge to an upper side of the main body and opens and closes the paper discharging unit and the smell dilution unit.

* * * * *

UNITED STATES PATENT AND TRADEMARK OFFICE
CERTIFICATE OF CORRECTION

PATENT NO. : 8,611,779 B2  
APPLICATION NO. : 13/064458  
DATED : December 17, 2013  
INVENTOR(S) : Jung et al.

Page 1 of 1

It is certified that error appears in the above-identified patent and that said Letters Patent is hereby corrected as shown below:

On the Title Page Item [75] (Inventors), Line 2, delete "Heung-suo Park," and insert -- Heung-sup Park, --, therefor.

Signed and Sealed this  
Twenty-second Day of July, 2014

Michelle K. Lee  
*Deputy Director of the United States Patent and Trademark Office*